United States Patent [19]
Muller et al.

[11] Patent Number: 5,561,837
[45] Date of Patent: Oct. 1, 1996

[54] MEMORY RELAY SYSTEM FOR OBSERVATION SATELLITES

[75] Inventors: Eric Muller, Fonsorbes; Laurent Diderot, Toulouse; Jean-Luc Rousson, Saiguede, all of France

[73] Assignee: Alcatel Espace, Nanterre Cedex, France

[21] Appl. No.: 252,314

[22] Filed: Jun. 1, 1994

[30] Foreign Application Priority Data

Jun. 2, 1993 [FR] France .................................. 93 06572

[51] Int. Cl.$^6$ ...................................................... H04B 7/185
[52] U.S. Cl. ............................................ 455/13.1; 455/12.1
[58] Field of Search ........................ 455/8–9, 11.1–13.4, 455/12.1, 13.1, 13.2, 13.3, 13.4, 33.1, 33.2, 33.3, 54.1; 370/104.1; 379/58, 59, 60, 63; 244/158 R

[56] References Cited

U.S. PATENT DOCUMENTS

| | | | |
|---|---|---|---|
| 3,497,807 | 2/1970 | Newton | 455/13.1 |
| 4,375,697 | 3/1983 | Uisher | 455/13.1 |
| 4,502,051 | 2/1985 | Dondl | 343/456 |
| 5,187,805 | 2/1993 | Bertiger et al. | 455/12.1 |
| 5,239,670 | 8/1993 | Schwendeman et al. | 455/13.1 |
| 5,410,731 | 4/1995 | Rouffet et al. | 455/13.1 |

FOREIGN PATENT DOCUMENTS 2134353  8/1984  United Kingdom .

OTHER PUBLICATIONS

Satellite Communications for Manned Spacecraft Durrani et al, IEEE Feb. 1971, pp. 128–131.

*Primary Examiner*—Reinhard J. Eisenzopf
*Assistant Examiner*—Lee Nguyen
*Attorney, Agent, or Firm*—Sughrue, Mion, Zinn, Macpeak & Seas

[57] ABSTRACT

The invention proposes a memory relay system for observation spacecraft, for example observation satellites or interplanetary probes. The object of the invention is to alleviate the absence or possible failure of onboard memory of these craft. The system of the invention provides a substitute solution which returns full functionality to an observation system capable of acquiring and transmitting observation data but not of storing it. In accordance with the invention, an artificial satellite or craft comprising at least one transponder and at least one writable memory is disposed near an observation satellite or a probe. The transponder is capable of receiving signals transmitted by the observation satellite or probe and then transmitting the signals to the Earth or to another destination. The memory of this artificial satellite or craft stores the information received until it is retrieved and retransmitted to the receiving station, a station on the ground, for example.

10 Claims, 4 Drawing Sheets

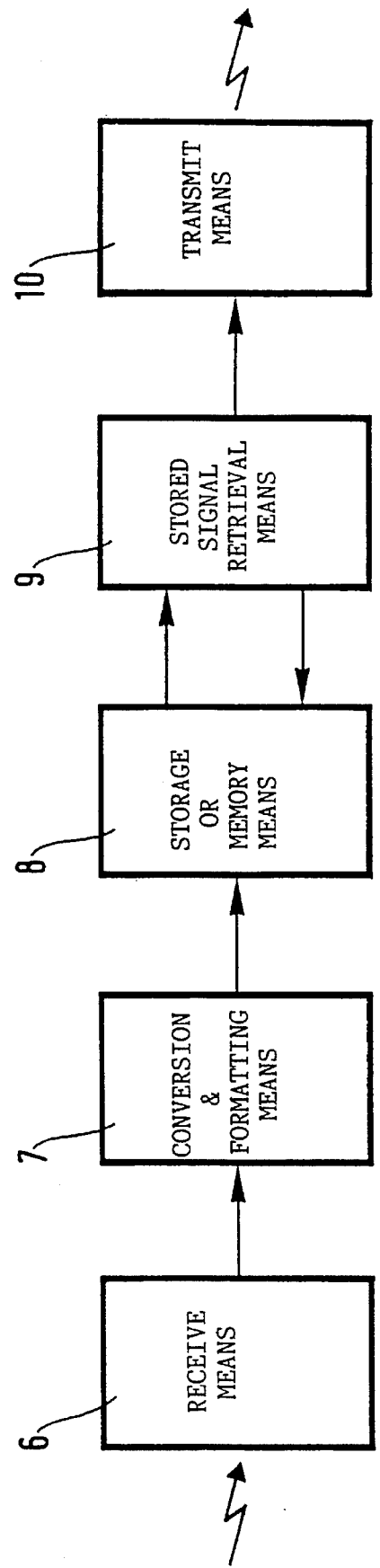

MEMORY RELAY SYSTEM FOR OBSERVATION SATELLITES

BACKGROUND OF THE INVENTION

1. Field of the Invention

The field of the invention is that of spacecraft and more particularly that of artificial satellites or probes on trajectories or in orbits which are not geostationary. Because they are not geosynchronous, these spacecraft do not have stable and unvarying geometrical relationships to a celestial body such as the Earth, for example. Satellites in low Earth orbit are one example: seen from a fixed point on the Earth, these satellites "track" across the sky until they disappear beyond the horizon.

2. Description of the Prior Art

Satellites of this kind are currently deployed in low Earth orbit, for Earth observation missions in particular, in which application they have the advantage of being able to observe practically all of the Earth as they travel in orbit and as the Earth rotates upon itself and relative to the orbital plane. On the other hand, because the position of these satellites in the sky is not fixed when seen from the Earth, fixed ground stations are not always able to transmit to or receive from them.

This is a problem in that observation satellites can observe the Earth throughout their orbit but can transmit their observations for processing only when they are over a ground station. A first generation of observation satellites (for example ERS-1, ERS-2) has been deployed under these conditions and the result is global observation with gaps representing geographical areas where there are no ground stations for receiving data.

The conventional solution to this problem is to provide these satellites with onboard means for memorizing and temporarily storing observation data on board the satellite to be subsequently retrieved and transmitted to a ground station when the satellite passes over a ground station. In the systems currently deployed these systems use magnetic recording means, for example. This is the case with the SPOT satellites, for example.

This prior art solution is satisfactory provided that the data recording and retrieval means operate correctly. Because these means are critical to the mission of a low Earth orbit observation satellite it is usual for these satellite onboard means to be redundant, i.e. there are at least two complete recording equipments on board, the second being adapted to be activated from the ground in the event of failure of the first.

Failure of both equipments considerably handicaps the satellite in performing its mission as, no longer able to store information, it can only transmit in real time data from observations effected when the satellite is in direct line of sight with a ground station.

The prior art has previously put forward two solutions: either to increase the number of ground stations or to use telecommunication satellites in geostationary orbit as relays for transmitting data from the observation satellite to existing ground stations. Each solution has drawbacks associated with the cost of designing and installing the necessary infrastructure and of operating this as yet non-existent infrastructure.

An object of the invention is to improve upon this situation.

SUMMARY OF THE INVENTION

To this end, the invention proposes a memory relay system for at least one observation spacecraft, the system comprising at least one memory relay craft comprising means for receiving signals from said observation craft, means for converting and formatting said signals for storage, storage or memory means, stored signal retrieval means and means for transmitting retrieved signals to a receiving station.

In a particularly advantageous configuration said memory relay craft is or are positioned so as to be constantly in direct line of sight with said observation spacecraft. In the case of an Earth observation satellite in low Earth orbit, for example, the memory relay craft can be another satellite in a similar orbit enabling the observation satellite to transmit data continuously, even in the event of failure of any onboard data storage and retrieval means.

The memory relay craft is advantageously disposed near the observation spacecraft for which it provides a relay, i.e. the distance between the two craft is substantially less than the distance between one of them and the celestial body nearest its trajectory. For an Earth observation satellite in low Earth orbit, for example, the distance between the observation and memory relay satellites will be less than the altitude of the low Earth orbit employed, in order to preserve the direct line of sight between the two satellites with no obstructions which could make communication between them difficult or even temporarily impossible.

In one specific embodiment of the invention an Earth observation satellite system comprises a number $n>1$ of observation satellites and the memory relay satellite system in accordance with the invention comprises the same number $n>1$ of memory relay satellites, each memory relay satellite being near one of the observation satellites.

In one advantageous embodiment of the invention an Earth observation satellite system comprises a number $n>1$ of observation satellites and the memory relay satellite system in accordance with the invention comprises a number $m \leq n$ of memory relay satellites, each memory relay satellite being near one of the observation satellites. This configuration is preferable for protecting against failure of onboard equipments on m observation satellites which are part of the system of n observation satellites, a memory relay satellite being located near each satellite whose onboard means are faulty.

In another embodiment of the invention a constellation of p small memory relay satellites can be deployed in orbit around a celestial body, this number p being fixed not according to the number of observation satellites or other satellites to be relayed, but according to the relative geometry of the orbits of the memory relay satellites and how they evolve around a celestial body. For example, a system of p small satellites can be deployed around the Earth in such a way that regardless of the position around the Earth of a satellite to be relayed this latter satellite has a small memory relay satellite in direct line of sight.

Although Earth observation satellites feature in the following detailed description as the main application of the invention, other applications are feasible within the scope of the invention. The description of the invention in terms of Earth observation satellites is given by way of non-limiting example of one field of application of the invention.

In particular, craft which are not in terrestrial orbit can be deployed in orbit around another planet, for example Mars. The same problems of failure of onboard data recording means can occur, and the invention enables them to be solved. Other craft can be relayed in the same way, for example space telescopes or interplanetary probes for observation of planets, their satellites or even comets or asteroids.

3

Other features and advantages of the system in accordance with the invention emerge from the following detailed description and the appended drawings.

BRIEF DESCRIPTION OF THE DRAWINGS

FIG. 4 is a diagram showing the flowchart of one embodiment of a memory relay craft in accordance with the invention.

DETAILED DESCRIPTION OF THE PREFERRED EMBODIMENT

The same reference numbers denote the same components in all the figures. To make the figures clearer they are to different scales.

Figure 1:
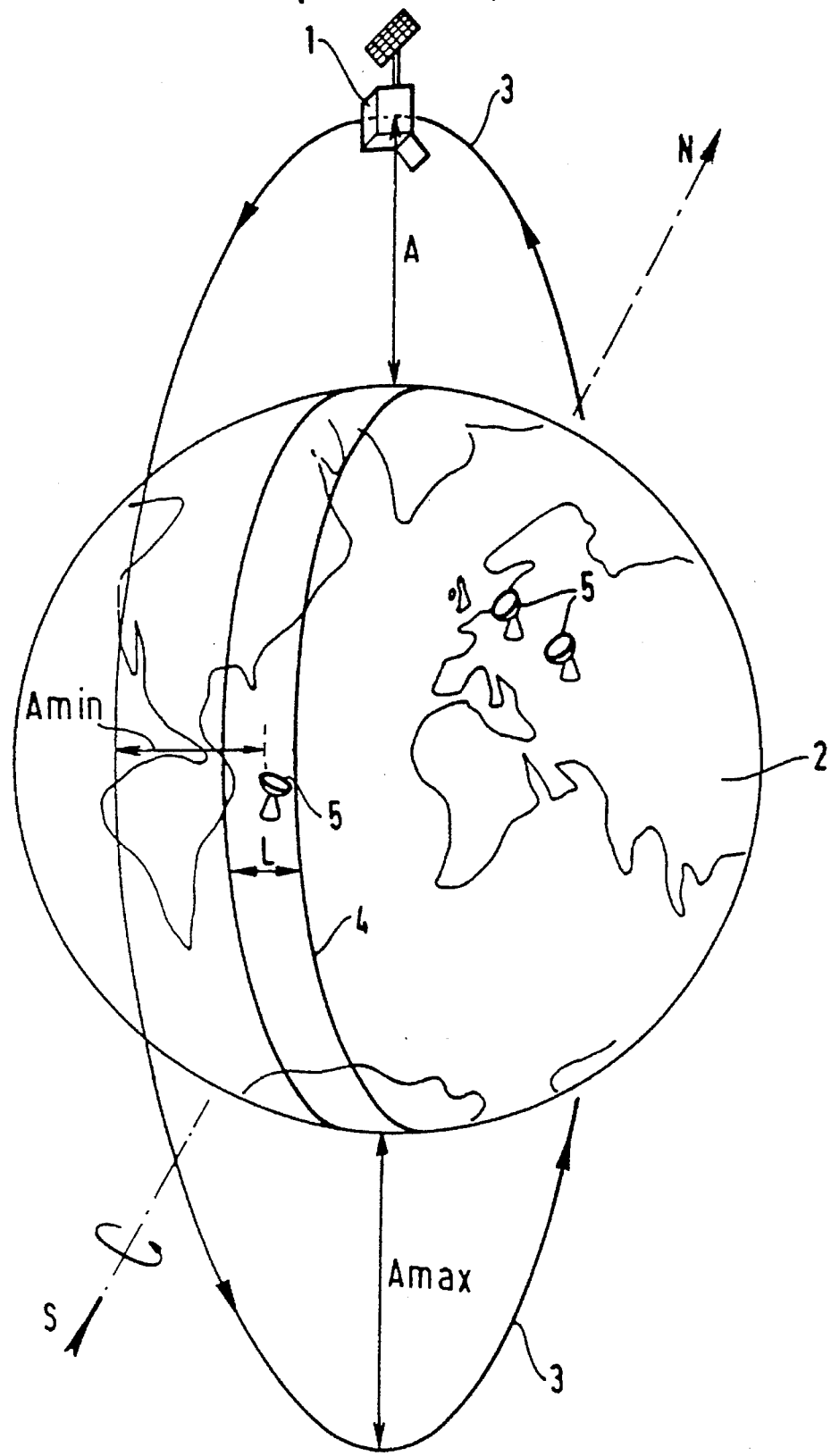
FIG. 1 is a diagram showing a prior art Earth observation satellite in low Earth orbit with its ground stations.

Referring to FIG. 1, an Earth observation satellite 1 is shown in a low Earth orbit 3 around the Earth 2. The satellite in this example is a SPOT type satellite, but the teaching of the invention is more general than this. A satellite of this type comprises electromagnetic radiation sensors which are responsive in spectral bands from the infrared (IR) to the ultraviolet (UV) via the visible light band, for example. These sensors can be responsive to the intensity and/or the wavelength of the radiation received at a given time or as a function of time. Knowing the position of the satellite as a function of time, it is possible by calculation to reconstruct the intensity image of the radiation as a function of position and therefore to map the object under observation (the Earth in this instance).

The satellite 1 in low Earth orbit 3 observes the Earth 2 directly below its path 3, covering a particular width L defined by the optics of the sensors and by the relative geometry of the satellite and the Earth. In the most general case the altitude A of the orbit 3 is not constant as the orbit is elliptical rather than circular. The altitude A therefore varies between a minimum value $A_{min}$ and a maximum value $A_{max}$. As it performs each orbit the satellite observes a strip 4 of width L around the Earth. As the satellite travels around the Earth the Earth turns under the satellite with the result that on completing an orbit the satellite is no longer above the same place as it was at the start of the orbit. For this reason Earth observation satellites are preferably deployed in polar orbits. The combination of the orbital trajectory and the rotation of the Earth causes the satellite to observe the entire planet in the course of time, with a period dependent on the orbit parameters.

Once acquired by the satellite, the observation data must be relayed to the Earth for processing and use. Ground stations 5 are provided for this purpose and are installed in a number of countries to constitute the terrestrial infrastructure of the SPOT program, for example. The satellite can transmit to one of these stations only if it has it in direct line of sight, i.e. if it is above the ground station. FIG. 1 shows that with a small number of ground stations the satellite is not over a station most of the time. This is why SPOT satellites, for example, carry data recorders to enable storage of data acquired throughout the orbit or possibly several

4 orbits and subsequent retrieval and off-line transmission of this data to the Earth, when the satellite is over a ground station.

A similar principle can be employed for synthetic aperture radar (SAR) imaging to produce a three-dimensional map of the surface of the Earth by synthesizing images on the basis of radar echo data acquired in motion.

The problem that the system in accordance with the invention can solve arises if the satellite carries data storage means that fail (SPOT, for example). The problem is the same for satellites with no storage means (ERS-1, for example).

Figure 2:
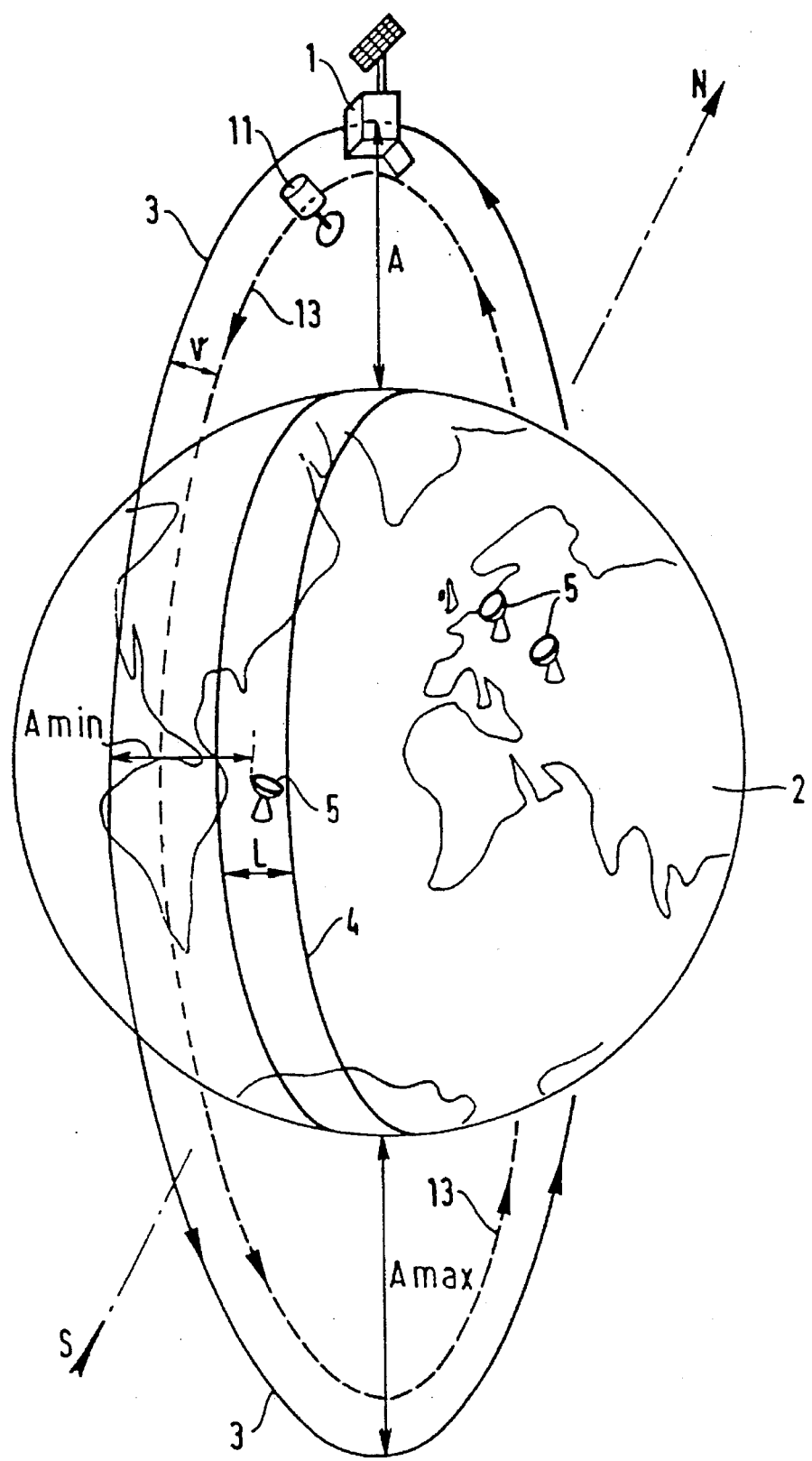
FIG. 2 is a diagram showing one example of a memory relay satellite in accordance with the invention near an Earth observation satellite as shown in FIG. 1.

FIG. 2 shows one example of a memory relay satellite in accordance with the invention near an Earth observation satellite as shown in FIG. 1. The memory relay satellite 11 is in low Earth orbit 13 and near the observation satellite 1 (at a distance v therefrom). This distance v is much less than the minimal distance of the satellite 1 from the Earth, the altitude $A_{min}$. As the two satellites travel around the Earth, they are sometimes in direct line of sight with a ground station 5 and sometimes not.

During periods in which there is no possibility of a direct link between the Earth observation satellite 1 and the ground station 5, the memory relay satellite 11 can receive the signals transmitted by the satellite 1 and store them in order to retrieve them and transmit them to the ground station 5 when its orbital position is such that it is in direct line of sight with the station.

Figure 3:
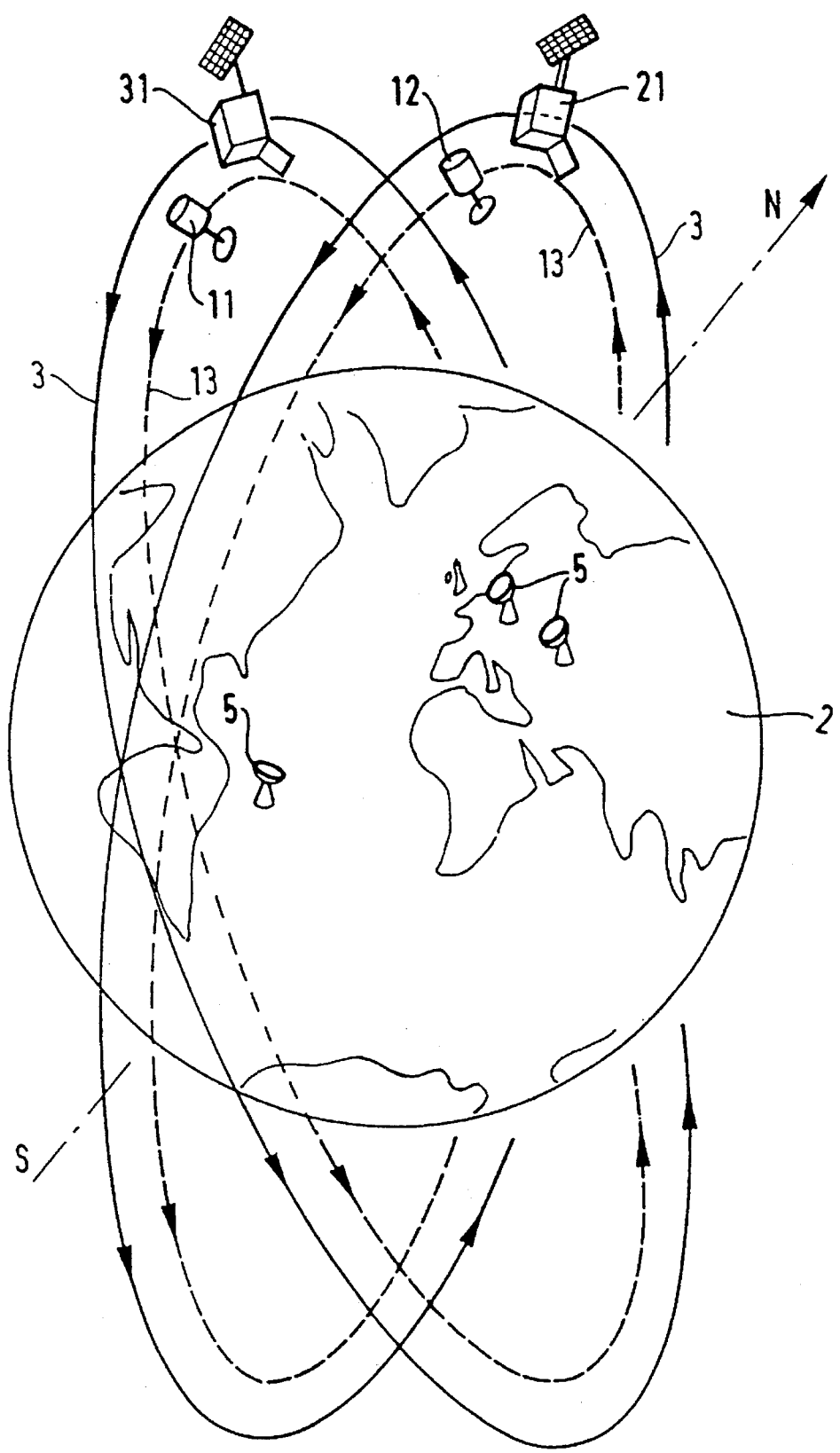
FIG. 3 is a diagram showing a system comprising a plurality of memory relay satellites in accordance with the invention serving a plurality of observation satellites.

FIG. 3 shows a system with a plurality (n>1) of observation satellites (21, 31, etc) and a plurality (m≦n) of memory relay satellites (12, 11, etc). In this example the onboard storage means of the m observation satellites (21, 31) have failed. To relay the faulty satellites (21, 31), m memory relay satellites (12, 11) have been deployed near them.

In an alternative embodiment of the invention (not shown) a system of p small satellites is deployed around the Earth (p>m) so that regardless of the position of an observation satellite around the Earth the satellite is always in direct line of sight with at least one of the p memory relay satellites.

FIG. 4 is a diagram showing the flowchart of one example of a memory relay craft in accordance with the invention. The blocks in this diagram are schematic representations of functions which can be implemented by dedicated or shared means. For example, the receive means 6 and the transmit means 10 can share some physical components, such as a transmit/receive antenna, or the craft can comprise two antennas, one for transmission and the other for reception.

FIG. 4 shows that the memory relay craft 11 further comprises means 6 for receiving signals from the observation craft 1, means 7 for converting and formatting these signals, storage or memory means 8, stored signal retrieval means 9 and means 10 for transmitting these signals to a ground station 5.

The person skilled in the art knows how to adapt these various prior art means to accomplish their mission in each specific implementation of the invention.

The receiving means 6 comprise, for example, a receive antenna and electronics for amplifying the received signals. These signals are in the form of digitally or analog modulated microwave electromagnetic radiation, for example. In this case the means 7 for converting and formatting the signals for storage are signal processing means for demodulating and if necessary digitizing the data in the signals. The information in the signals can therefore be stored in digital form, in digital semiconductor memory storage means 8, or in digital or analog form by magnetic recorders, for example. The data retrieval means 9 are able to read the memory or the recording made by the storage means 8 and to supply the data to the transmit means 10. These transmit means can, for example, comprise electronics for modulating and amplifying microwave signals and an antenna for transmitting this signal.

The examples shown in the figures concern craft in terrestrial orbit. Nevertheless, the invention is equally applicable to craft in orbit around another celestial body such as the Moon or Mars.

The examples given concern trajectories with a period, i.e. trajectories which close on themselves after a certain number of orbits. The invention can also be used for craft on open trajectories such as interplanetary probes. The problem that can then arise is to place the memory relay craft near the observation craft to be relayed, especially if the latter has already been travelling for several years. Nevertheless, this is possible in most cases.

The means constituting a memory relay craft have been described by way of non-limiting example only and equivalent means providing the same functions can be used instead without departing from the scope of the invention.

Finally, the example shown in the figures utilize a ground station. It is to be understood that the receiving station can be on another celestial body (for example the Moon) or even on another craft, for example another satellite or an aircraft.

There is claimed:

1. A spatial observation system for observing a celestial body comprising:

a ground station (5) placed on said celestial body;

an observation satellite moving around said celestial body for getting information data from observation of said celestial body when moving in a non-stationary orbit and for transmitting said information data to said ground station when passing over said ground station, said information data being recorded in said observation satellite during no link periods when there is no direct link between said ground station and said observation satellite;

a memory relay satellite moving around said celestial body in a non-stationary orbit of said celestial body so as to be constantly in direct line of sight with said observation satellite, said memory relay satellite comprising:

means for receiving information data transmitted by said observation satellite when a failure of said observation satellite's recording means is occurring during said no link periods;

means for storing said information data received during said no link periods; and means for transmitting said stored information data to said ground station when passing over said ground station.

2. The spatial observation system according to claim 1, wherein said memory relay satellite is near the observation satellite for which it provides a relay.

3. The spatial observation system according to claim 1 further comprising: a number $n \geq 1$ of observation satellites and a number $m \leq n$ of memory relay satellites.

4. The spatial observation system according to claim 1, further comprising: a number $n \geq 1$ of observation satellites and a number $m \geq n$ of memory relay satellites.

5. A memory relay craft for a spatial observation system for observing a celestial body, the spatial observation system including: a ground station (5) placed on said celestial body; an observation spacecraft moving around said celestial body for getting information data from observation of said celestial body when moving in a non-stationary orbit and for transmitting said information data to said ground station when passing over said ground station, said information data being recorded in said observation spacecraft during no link periods when there is no direct link between said ground station and said observation spacecraft; and said memory relay craft moving around said celestial body in a non-stationary orbit of said celestial body so as to be constantly in direct line of sight with said observation spacecraft, said memory relay craft comprising:

means for receiving information data transmitted by said observation spacecraft when a failure of said observation spacecraft's recording means is occurring during said no link periods;

means for storing said information data received during said no link periods; and means for transmitting said stored information data to said ground station when passing over said ground station.

6. The memory relay craft according to claim 5, wherein said observation spacecraft is a satellite.

7. The memory relay craft according to claim 6, wherein said spatial observation system comprises a number $n > 1$ of observation satellites and a number $m \leq n$ of memory relay satellites.

8. The memory relay craft according to claim 6, wherein the spatial observation system comprises a number $n \geq 1$ of observation satellites and a number $m \geq n$ of memory relay satellites.

9. The memory relay craft according to claim 5, wherein the memory relay craft is near the observation spacecraft for which it provides a relay.

10. The memory relay craft according to claim 5, wherein said observation spacecraft is an interplanetary probe.

* * * * *